(No Model.) 2 Sheets—Sheet 2.
J. E. MILLS.
EXHAUST FAN.
No. 267,707. Patented Nov. 21, 1882.
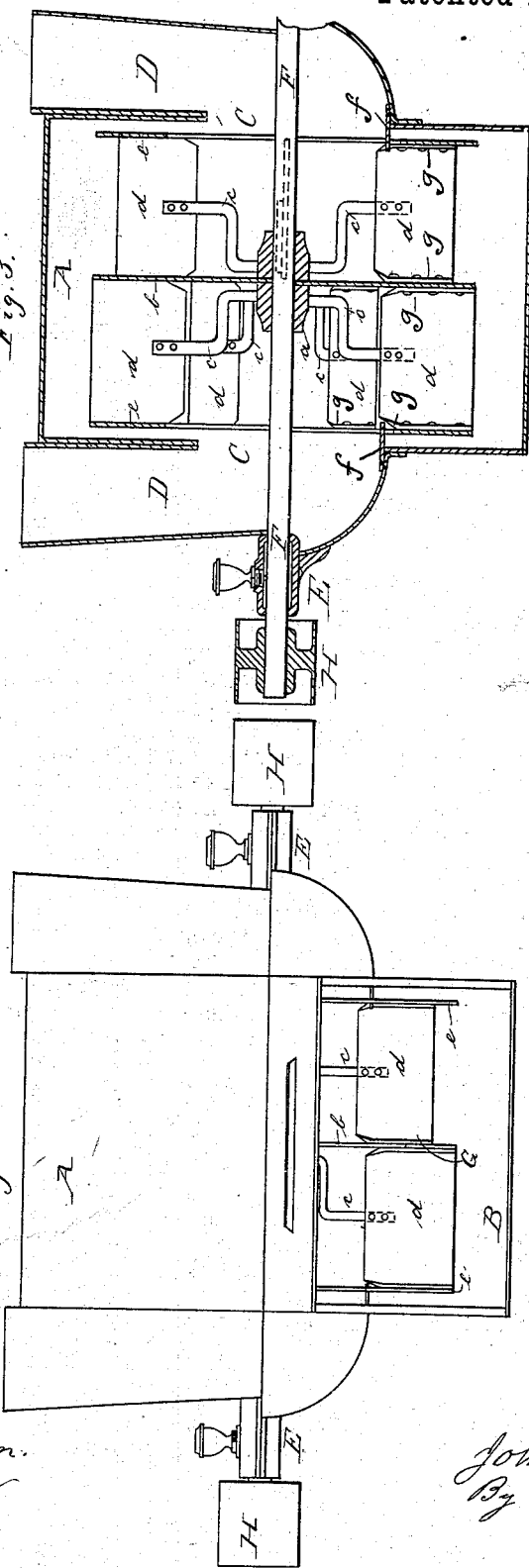
Witnesses
R. W. Kaschagen.
P. W. Adams.
Inventor
John E. Mills
By Wm H Lotz
Attorney
N. PETERS, Photo-Lithographer, Washington, D. C.

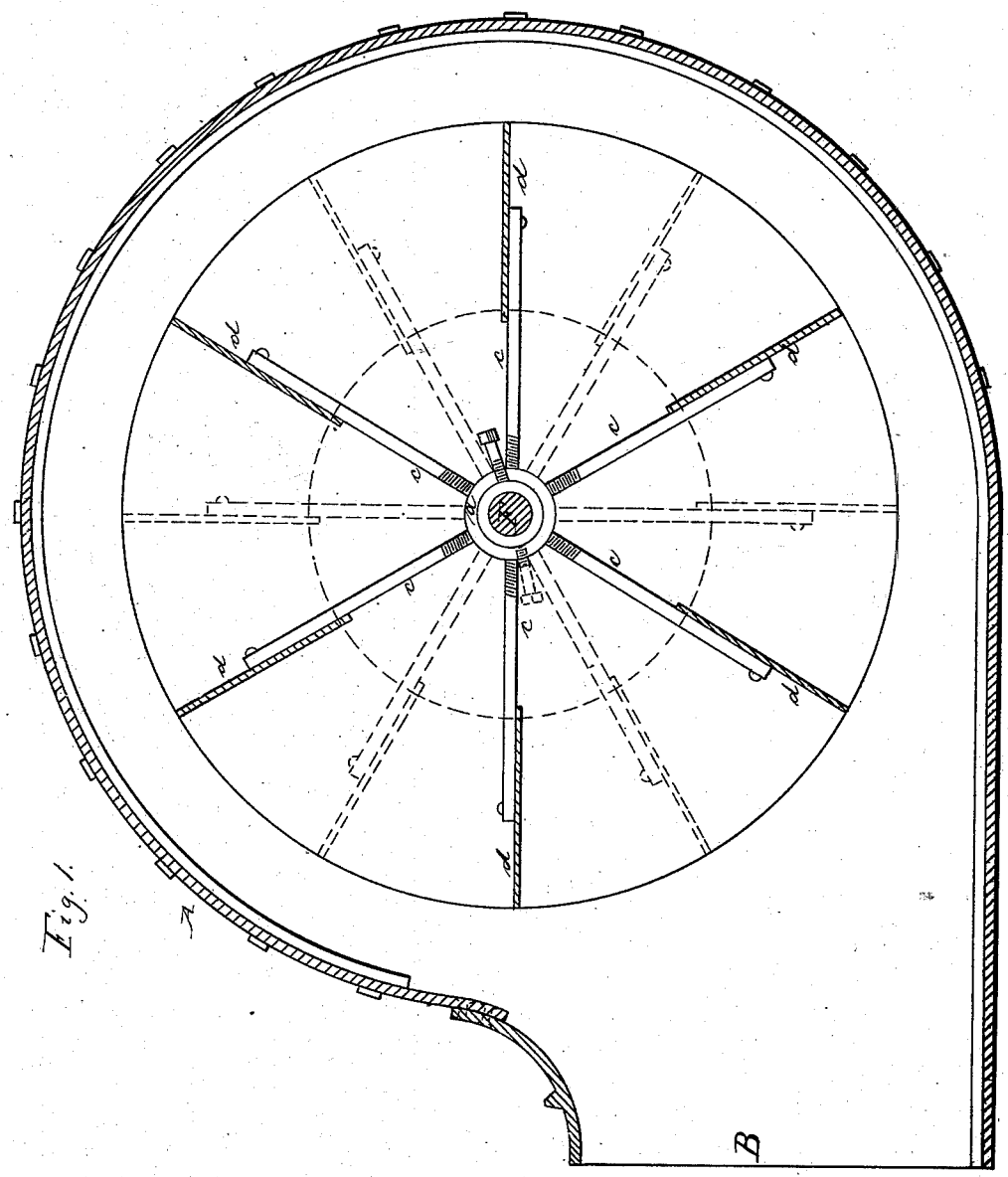

UNITED STATES PATENT OFFICE.

JOHN E. MILLS, OF CHICAGO, ILLINOIS.

EXHAUST-FAN.

SPECIFICATION forming part of Letters Patent No. 267,707, dated November 21, 1882.

Application filed March 7, 1882. (No model.)

*To all whom it may concern:*

Be it known that I, JOHN E. MILLS, of Chicago, in the county of Cook and State of Illinois, have invented certain new and useful Improvements in Exhaust-Fans; and I do hereby declare that the following is a full, clear, and exact description thereof, reference being had to the accompanying drawings, and to the letters of reference marked thereon, which form a part of this specification.

This invention relates to exhaust-fans that are used in flour and planing mills for removing the dust and shavings; and it is my object to produce a duplex fan that will take up no more room and will require no more driving-power than a single fan, and will have an increased working capacity over such fans.

My invention consists of the novel devices and combinations of devices hereinafter described and specifically claimed.

In the accompanying drawings, Figure 1 represents a longitudinal vertical section of my fan; Fig. 2, a front elevation, and Fig. 3 a vertical cross-section, of the fan.

Like letters designate corresponding parts in all the figures.

A denotes the casing, which is cylindrical and has a horizontal discharge-passage, B. The circular side openings, C, are covered by vertical flues D that form the air-inlets. Externally to these flues D are secured the journal-boxes E for the fan-shaft F. Upon the middle of fan-shaft F is rigidly mounted the duplex fanning-wheel G. This wheel G has a hub, $a$, carrying a center disk, $b$, and upon each end of this hub are secured a series of radial arms, $c$, which are laterally bent, and their ends are riveted to the blades or wings $d$. These wings $d$ extend from both sides of the central disk, $b$, and their edges are flanged and riveted, as shown at $g$, at one end to the central disk, $b$, and at their opposite ends to the exterior annular plates, $e$. The blades or wings $d$ are placed at equal distances apart and alternately at one side of the disk $b$ to the blades at the other side of such disk. Upon both ends of the shaft F, adjacent to the journal-boxes, are mounted the driving-pulleys H. The arms for holding the wings being placed toward the central disk thereby leaves the ends unobstructed for any material drawn in by the exhaust-draft until such material has arrived between the wings, whence it is carried off with the air by the centrifugal force of the fan acting upon it with full power.

For the purpose of preventing chips and shavings from working in between the fanning-wheel and casing, I have provided the side flues, D, with fender-plates $f$ that reach into the wheel from each side to near the blades.

A duplex fan thus constructed and arranged is cheaper to make, is more compact, and is less liable to get out of order than double fans as heretofore made that were mounted on a single shaft.

I am aware that it is not new to construct rotary blowers with the fan divided by a disk vertically into two portions, with a common discharge-pipe and independent inlet-pipes, the wings of the fan being alternately mounted upon the shaft on each side of the dividing-disk; but I am not aware of any device having laterally-bent arms $c$, carrying wings $d$, having flanged edges by means of which such wings are attached respectively to the disk $b$ and plates $e$, as described herein, and clearly shown in the drawings.

What I claim is—

1. In a rotary fan-blower, the duplex fanning-wheel G, having hub $a$, a center disk, $b$, carried by said hub, laterally-bent radial arms $c$ and wings $d$, arranged alternately upon either side of the disk $b$, and having flanged edges by means of which they are attached respectively to the disk $b$ and plates $e$, said arms $c$ being secured upon each end of the hub $a$ and riveted to the blades or wings $d$, substantially as and for the purpose set forth.

2. In a rotary fan-blower, the side flues, $d$, provided with fender-plates $f$, extending from each side of the casing and within the wheel for the purpose of preventing chips and shavings from working between the fanning-wheel and casing, substantially as set forth.

In testimony that I claim the foregoing as my invention I affix my signature in presence of two witnesses.

JOHN E. MILLS.

Witnesses:
F. W. KASEHAGEN,
W. C. ADAMS.